United States Patent

Roskey

[11] Patent Number: 5,931,522
[45] Date of Patent: Aug. 3, 1999

[54] MAGNETIC MOTOR VEHICLE BODY PROTECTION APPARATUS AND METHOD OF USE OF THE SAME

[76] Inventor: Timothy Allen Roskey, 220 Bancroft Close, Alberta, Canada, T6E 1X2

[21] Appl. No.: 09/141,045

[22] Filed: Aug. 27, 1998

[51] Int. Cl.[6] .................................................. B62D 25/00
[52] U.S. Cl. .................................... 296/136; 280/770
[58] Field of Search .......................... 296/136; 280/770; 293/128

[56] References Cited

U.S. PATENT DOCUMENTS

| | | | |
|---|---|---|---|
| 3,147,176 | 9/1964 | Haslam | 161/39 |
| 4,187,332 | 2/1980 | Fouche, Jr. | 427/47 |
| 4,291,467 | 9/1981 | Shultz, Jr. | 33/177 |
| 4,310,978 | 1/1982 | Stern | 40/600 |
| 4,708,380 | 11/1987 | Cruz | 293/128 |
| 4,835,024 | 5/1989 | Hallay | 428/24 |
| 5,077,101 | 12/1991 | Conway et al. | 428/17 |
| 5,144,877 | 9/1992 | Parks | 89/36.01 |
| 5,158,324 | 10/1992 | Flesher | 296/136 |
| 5,280,989 | 1/1994 | Castillo | 296/136 |
| 5,312,145 | 5/1994 | McNeil | 293/128 |
| 5,549,938 | 8/1996 | Nesbitt | 428/17 |
| 5,820,201 | 10/1998 | Jabalee | 296/136 |

*Primary Examiner*—Gary C. Hoge
*Attorney, Agent, or Firm*—Davis and Bujold

[57] ABSTRACT

A magnetic motor vehicle body protection apparatus includes a sheet of flexible magnetic material of a thickness capable of being cut with scissors. Markings are provided on the sheet providing an outline of a portion of a body of an motor vehicle. The sheet is cut to size and magnetically adhered to a panel section of a vehicular body with the sheet substantially contiguous with that portion of the vehicular body being covered, such that any scrape or blow to that portion of the body is absorbed by the sheet.

4 Claims, 2 Drawing Sheets

MAGNETIC MOTOR VEHICLE BODY PROTECTION APPARATUS AND METHOD OF USE OF THE SAME

FIELD OF THE INVENTION

The present invention relates to a magnetic motor vehicle body protection apparatus and method of use of the same.

BACKGROUND OF THE INVENTION

The use of magnetic motor vehicle protectors has a long history. U.S. Pat. No. 3,147,176 which issued to Haslam in 1964 discloses a magnetic protector strip which protects a car door from damage caused by scraping or bumping. U.S. Pat. No. 5,312,145 which issued to McNeil in 1994 discloses a more recent version of magnetic motor vehicle protector. The McNeil reference discloses a plurality of hinged panels which are conveniently stored in a folded condition, but can readily be deployed to magnetically attach to any metal bodied motor vehicle.

SUMMARY OF THE INVENTION

What is required is an alternative form of magnetic motor vehicle body protection apparatus.

According to one aspect of the present invention there is provided a magnetic motor vehicle body protection apparatus which includes a sheet of flexible magnetic material substantially conforming to a shape of a panel section of a motor vehicle.

The magnetic motor vehicle body protection apparatus, as described above, is intended to cover entire portions of a vehicular body, such as the entire door panel or the entire quarter panel. Whereas the prior art magnetic motor vehicle body protection apparatus are localized in their protection, the above described magnetic motor vehicle body protection apparatus provides a thin layer of protection to an entire door or an entire quarter panel. Regardless of where contact occurs, some protection is afforded by the vehicle body protection apparatus.

Although beneficial results may be obtained from the magnetic motor vehicle body protection, as described above, a plurality of discrete sections can create problems in handling and storage. Even more beneficial results may, therefore, be obtained when the magnetic motor vehicle body protection apparatus includes a sheet of flexible magnetic material of a thickness capable of being cut with scissors. Markings are provided on the sheet providing an outline of a portion of a body of a motor vehicle. In this manner all panel sections for a motor vehicle can be handled and stored as a single rectangular sheet. This virtually eliminates the possibility that any of the sections becoming lost or damaged.

Although beneficial results may be obtained through the use of the magnetic motor vehicle body protection apparatus, as described above, there are a wide variety of models of motor vehicle. Even more beneficial results may, therefore, be obtained when the outlines of portions of bodies of several models of motor vehicle are depicted in different styles of markings on the same sheet.

According to another aspect of the present invention, there is provided a method of protecting a body of a motor vehicle with a magnetic motor vehicle body protection apparatus. The first step involves providing a magnetic motor vehicle body protection apparatus consisting of a sheet of flexible magnetic material capable of being cut with scissors and having markings providing an outline of a portion of a body of a selected motor vehicle. The second step involves cutting out the outline of the portion of the body for the selected motor vehicle having regard to the markings on the sheet. The third step involves magnetically adhering the sheet to the portion of the body of the selected motor vehicle with the sheet substantially contiguous with the portion of the body being covered, such that any scrape or blow to that portion of the body is absorbed by the sheet.

In accordance with the teachings of this method, contiguous protective coverage is provided for every portion of the motor vehicle that is covered. A type of vehicle presently enjoying popularity is referred to as a "sport utility" vehicle. Sport utility vehicles are expensive luxury vehicles that have four wheel drive and, as such, are capable of "off road" use. If one were to protect such a sport utility vehicle prior to an off road use, it would be advisable to completely cover the lower portion of the vehicle as described above. By completely covering the vehicle one could avoid scratches from low lying bushes that otherwise would be inevitably arise out of off road use.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
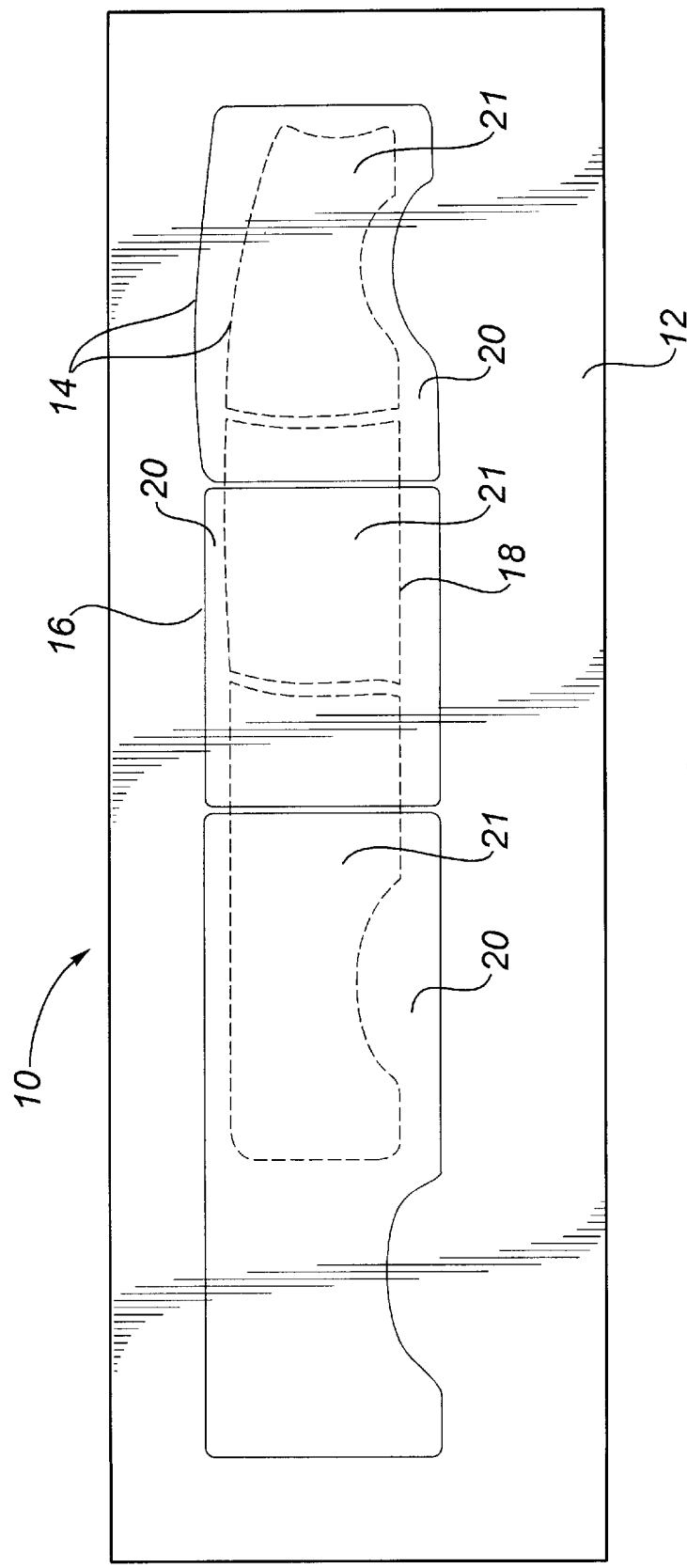
FIG. 1 is top plan view of a magnetic motor vehicle body protection apparatus constructed in accordance with the teachings of the present invention.

The preferred embodiment, a magnetic motor vehicle body protection apparatus generally identified by reference numeral 10, will now be described with reference to FIGS. 1 and 2.

Figure 2:
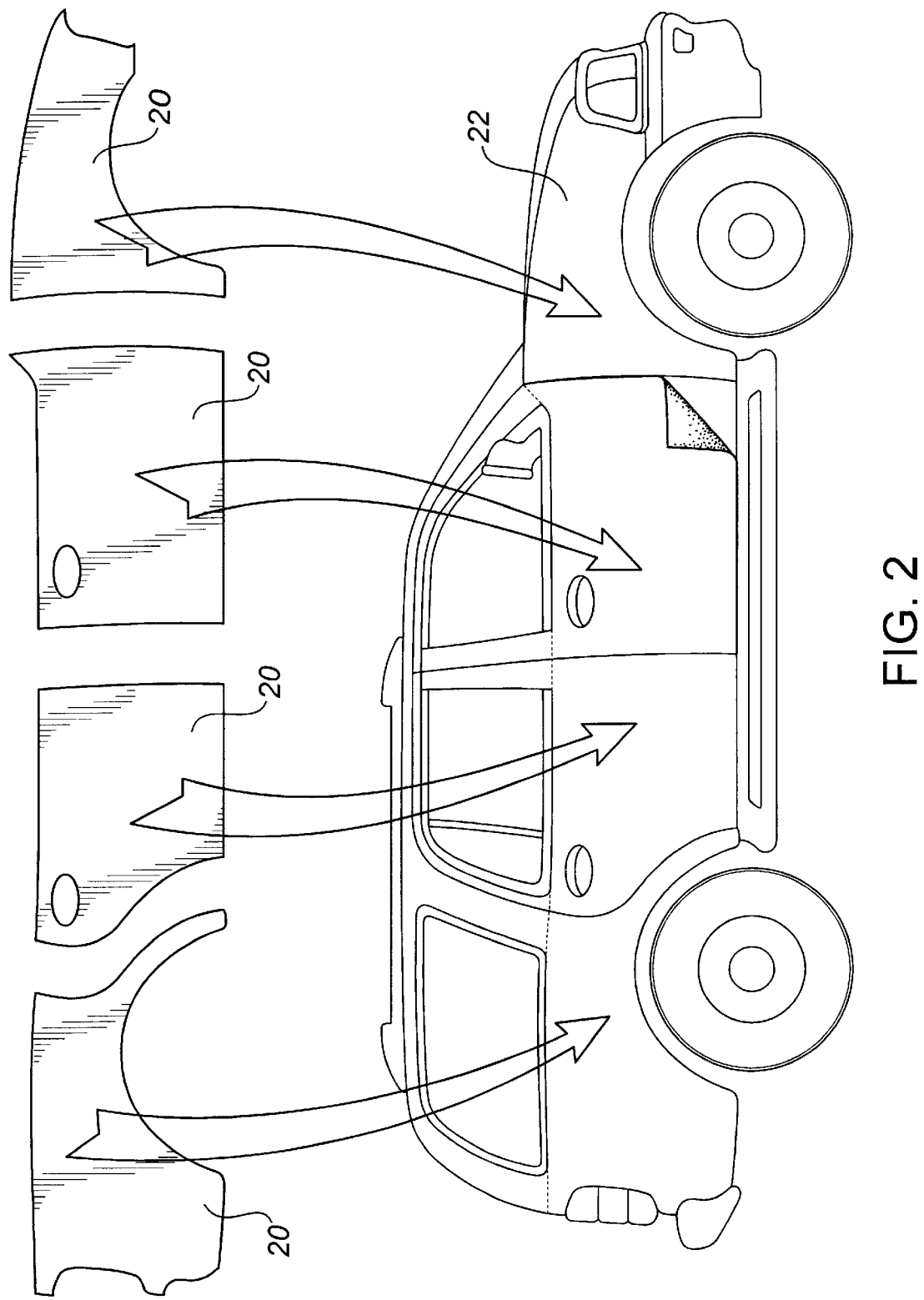
FIG. 2 is a side elevation view of a motor vehicle equipped with magnetic motor vehicle body protection apparatus in accordance with the teachings of the present method.

Referring to FIG. 1, magnetic motor vehicle body protection apparatus 10 includes a sheet of flexible magnetic material 12. In order to maintain its utility, sheet 12 must capable of being cut with scissors. As will hereinafter be further described, it is intended that apparatus 10 be visually unobtrusive to the point that a careful inspection is required to determine whether apparatus 10 has been placed on a motor vehicle body. It is, therefore, preferred that sheet 12 have a thickness of less than 3/16 of an inch. When the thickness of sheet 12 exceeds 3/16 of an inch, sheet 12 becomes noticeable to an observer and has sufficient additional weight that is ability to adhere is diminished. A plurality of markings 14 are provided on sheet 12 to provide outlines of panel sections from a body of a motor vehicle. It is intended that different types of markings 14 will designated different models of vehicle. In the illustrated embodiment, markings 14 include solid lines 16 and dotted lines 18. Solid lines 16 outline panel sections 20 of a first model of vehicle. Dotted lines 18 outline panel sections 20 of a second model of vehicle.

The preferred method of use of apparatus 10 will now be described with reference to FIGS. 1 and 2. Referring to FIG. 2, there is illustrated a motor vehicle, generally identified by reference numeral 22. Referring to FIG. 1, a first step involves providing a magnetic motor vehicle body protection apparatus 10, substantially as described above. A second step involves cutting out panel sections 20 suitable for motor vehicle 22 having regard to markings 16 or 18 on sheet 12. Referring to FIG. 2, a third step involves magnetically adhering cut out panel sections 20 to motor vehicle 24. It will be noted that panel sections 20 are substantially contiguous with that portion of motor vehicle 24 being covered. When in place, a close visual inspection of motor vehicle 24 is required to confirm whether or not panel sections 20 are in place. However, any scrape or blow to body 22 is absorbed by sheet 12. With a thickness of less than 3/16 of an inch, apparatus 10 cannot withstand severe blows. It is viewed as being sufficient, however, to absorb the typical day to day scrapes and blows to which motor vehicles are subjected in environments such as parking lots.

It will be apparent to one skilled in the art that panel sections 20 could be sold as discrete pieces, rather than incorporated into sheet 12. It will also be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A magnetic motor vehicle body protection apparatus, comprising:

a sheet of flexible magnetic material of a thickness capable of being cut with scissors; and markings on the sheet providing an outline of a panel section of a motor vehicle.

2. The magnetic motor vehicle body protection apparatus as defined in claim 1, wherein the thickness of the magnetic material is less than 3/16 of an inch.

3. The magnetic motor vehicle body protection apparatus as defined in claim 1, wherein the outlines of the panel sections of several models of motor vehicle are depicted in different styles of markings on the same sheet.

4. A method of protecting a body of a motor vehicle with a magnetic motor vehicle body protection apparatus, comprising the steps of:

providing a magnetic motor vehicle body protection apparatus consisting of a sheet of flexible magnetic material capable of being cut with scissors and having markings providing an outline of panel sections of a selected motor vehicle;

cutting out the outline of the panel sections of the selected motor vehicle having regard to the markings on the sheet;

magnetically adhering the sheet to the motor vehicle with the sheet positioned substantially contiguous with the panel sections being covered, such that any scrape or blow to those panel sections is absorbed by the sheet.

* * * * *